2,845,464

PURIFICATION OF BIS(HYDROXYARYL)-SUBSTITUTED COMPOUNDS

Daniel B. Luten, Jr., Berkeley, Calif., assignor to Shell Development Company, New York, N. Y., a corporation of Delaware No Drawing. Application November 15, 1954
Serial No. 468,987

7 Claims. (Cl. 260—619)

This invention relates to the purification of bis(hydroxyaryl) compounds and relates more particularly to the purification of hydroxyphenyl alkanes wherein the nuclei of two phenolic radicals are directly attached to a single carbon atom in the alkyl group. A particular aspect of the invention relates to the purification of crude gem di-(p-hydroxyphenyl)propane.

The hydroxyphenyl-substituted compounds, such as, for example, the bis(hydroxyphenyl) alkanes, are employed as starting and intermediate materials in the production of a wide variety of organic products. Methods for their production comprise the acid-catalyzed condensation of a phenolic compound with a carbonyl compound, for example, a ketone or an aldehyde, and the decomposition of corresponding aralkyl hydroperoxides. Ability to employ the hydroxyphenyl-substituted compounds in many fields of application is often dependent upon the degree of their purity. A relatively high degree of purity is often not readily attainable in large scale operation without undue restriction upon process variables, or without resorting to relatively complex and costly operative procedures. Treatment of the hydroxyphenyl-substituted compounds during the course of their production while in the liquid state, for example with solvents, is often unsuccessful; a substantial part of the impurities encountered in their manufacture usually being preferentially soluble in the hydroxyaryl compound under the conditions of their production and recovery. Mere washing of the finished product with solvents at ordinary conditions is generally ineffective in removing at least a substantial part of residual impurity.

It has now been found that crude hydroxyphenyl-substituted alkanes, such as, for example, 3,2-di(p-hydroxyphenyl)propane, is freed of at least a substantial part of the residual impurities formed during its manufacture by leaching with a liquid paraffinic hydrocarbon solvent at a temperature in the range of from about 50° C. up to the boiling temperature of the solvent but below the melting point of the impure hydroxyphenyl alkane.

The invention is applied broadly to the purification of bis(hydroxyaryl)-compounds regardless of the method of their production. It is applied with advantage to the purification of crude hydroxyphenyl-substituted alkanes wherein the nuclei of two phenolic radicals are directly attached to a single carbon atom in the alkyl group, such as, for example, 2,2-di(p-hydroxyphenyl)propane. The invention is applied with particular advantage to the purification of the crude hydroxyphenyl alkanes obtained by the acid-catalyzed condensation of a phenolic compound with a carbonyl compound, such as, for example, a ketone or an aldehyde.

The complex nature of the mixture of residual impurities generally encountered in the crude hydroxyphenyl alkanes renders exceedingly difficult identification of individual components thereof. In general, these impurities often comprise isomeric forms of the desired hydroxyphenyl compound as well as higher boiling materials which may comprise polymeric, or resinous, materials formed during the manufacture of the compound.

In a preferred method of carrying out the purification of the hydroxyphenyl alkanes in accordance with the invention, the compound to be purified, for example, 2,2-bis(4-hydroxyphenyl)propane obtained by the acid-catalyzed condensation of phenol with dimethylketone, is suspended in the solid state in liquid paraffinic hydrocarbon solvent which has been preheated to a temperature in the range of from about 50° C. to about 140° C. The resulting suspension is preferably agitated while maintained at the elevated temperature. Thereafter the solid is separated from the solvent.

Solvents employed in accordance with the process of the invention comprise paraffinic hydrocarbons which are liquid under the treating conditions employed. These comprise, for example, the normally liquid paraffinic hydrocarbons of open and closed chain structure such as the pentanes, hexanes, heptanes, octanes, nonanes, decanes, and the corresponding cycloparaffins, etc. Particularly preferred are the paraffinic hydrocarbons having from five to ten carbon atoms in the molecule. Suitable hydrocarbon solvents comprise the normally liquid hydrocarbon fractions containing two or more of the foregoing hydrocarbons.

Essential to the attainment of the objects of the invention is the leaching of the hydroxyphenyl alkane to be purified in the solid state at a temperature above 50° C. but below its melting point. Thus, when purifying crude 2,2-bis(4-hydroxyphenyl)propane the compound is leached at a temperature above about 50° C., and preferably above about 80° C., and below about 140° C. A preferred temperature range comprises a temperature in the range of from about 80° C. to about 120° C. The hydrocarbon solvent is preferably heated to the desired treating temperature prior to contact with the crude solid hydroxyphenyl alkane. Contacting the compound to be purified with the hydrocarbon solvent at a lower temperature and thereafter heating the suspension to a temperature within the above-defined temperature range may, however, be resorted to within the scope of the invention. The use of substantially atmospheric pressure is generally satisfactory in carrying out the process of the invention. The use of sub-atmospheric or superatmospheric pressures during the leaching operation is, however, comprised within the scope of the invention.

The hydroxyphenyl alkane to be purified is contacted with the paraffinic solvent in the solid state. The compound is preferably added to the solvent in the form of relatively small pieces, chunks, flakes, granules, powder or the like. Any suitable means may be employed to break up large masses of the impure compound to the smaller state suitable for carrying out the process of the invention.

Leaching of the solid hydroxyphenyl alkane may be effected by contacting the crude compound with the paraffinic solvent at a temperature in the above-specified temperature range in a suitable contacting zone enabling intimate contact between the solvent and the compound to be purified. Thus, the solvent heated to the desired temperature may be cycled continuously through a bed of the crude hydroxyphenyl compound. Another method of operation comprises the counter-current passage of solvent and hydroxyphenyl alkane through a contacting zone. In another method of operation the solid hydroxyphenyl alkane is passed through a zone containing the paraffinic hydrocarbon solvent. In still another method of operation, a suspension of solid hydroxyphenyl alkane and paraffinic solvent is passed while at the prescribed elevated temperature through an elongated zone of relatively restricted cross-sectional area, such as, for example, a tube, column, or the like. The tube, or column, thus employed may optionally be provided with suitable baffles, or the like, to assure turbulent flow of the suspension therethrough.

In a suitable method of operation, however, the solid hydroxyphenyl alkane, in relatively small pieces, particles or chunks, is introduced into a zone of enlarged cross-sectional area, for example, a chamber, in which a high liquid level of the paraffinic solvent, such as, for example, liquid normal heptane, is maintained at a temperature above 50° C. The mixture in the chamber is agitated by suitable means comprising, for example, a stirrer or the like. Other means such as, for example, injection of inert gas, continuous cycling of chamber contents through a zone of agitation, etc., may be resorted to to maintain the hydroxyphenyl alkane in intimate contact with the solvent.

In another method of operation the solid hydroxyphenyl alkane to be purified is charged, in the solid state, into a treating chamber in communication with a still. Preheated solvent is introduced into the chamber in sufficient amount to result in a liquid level of solvent above the solid hydroxyphenyl alkane in the chamber. The treating vessel is provided with means, such as, for example, a jacket, or electrical lagging, to maintain the temperature therein within the treating range prescribed herein. After a suitable time of contact at the treating temperature solvent is passed from the treating chamber into the still and fresh solvent is introduced into the treating chamber. A plurality of treating chambers may be in communication with a single still. Within the still solvent is distilled from impurities. Distilled solvent leaving the still is condensed and passed to a treating chamber. The complete cycle, comprising the flooding of the treating chamber with preheated solvent and withdrawal of solvent after a period of contact with the contents of the chamber, is repeated until the desired degree of product purity is obtained.

The hydroxyphenyl alkane is maintained in contact with a sufficient quantity of the hot solvent in a single, or plurality of repeated operations, for a sufficient time to effect the leaching of at least a substantial part of the impurity content therefrom. The specific time of contact employed will of course vary in accordance with the ratio of solvent to product being purified, the nature of the charge, the temperature of the treatment, and the degree of purification desired.

During contact of the hydroxyphenyl alkane with the liquid paraffinic hydrocarbon solvent in the prescribed temperature range, impurities, comprising isomeric forms of the desired compound, organic impurities of resinous character, as well as residual amounts of unreacted materials employed in manufacturing the desired product, etc., are removed by a combination of processes involving one or more such steps as solution, mechanical entrainment, phase separation, etc., leaving the treated solid hydroxyphenyl alkane free of any substantial amount of these impurities.

The hydroxyphenyl alkane, now free of any substantial amount of impurities, is separated from the hydrocarbon solvent without substantial reduction in temperature. Means employed to effect the separation of the hydroxyphenyl alkane from the hot liquid paraffinic hydrocarbon solvent may comprise one or more such steps as, for example, stratification, decantation, filtering, centrifuging, adsorption, etc. In a preferred method of carrying out the invention, the purified hydroxyphenyl alkane is separated from the impurity-laden liquid hydrocarbon solvent by filtering at the elevated temperature with suitable filtering means, such as, for example, a filter of the rotary cylinder type. The hydroxyphenyl alkane, now free of any substantial amount of impurity, is freed of any residual amount of solvent after separation from the body of solvent by conventional drying means.

The impurity-laden solvent may be subjected to distillation under conditions resulting in the passage of solvent overhead, leaving a solution of impurities in solvent as distillation bottoms. The solvent overhead from the distillation is recycled to the hydroxyphenyl alkane leaching operation.

The process of the invention thus provides a means for removing effectively, and with a minimum of operative procedures, residual impurities from crude hydroxyphenyl alkanes. The efficiency with which the process of the present invention enables removal of impurities obviates the need to maintain conditions during the manufacture of the hydroxyphenyl alkanes strictly within the narrow limits capable of producing a product of some degree of purity, thereby providing to the manufacturing step a substantially greater degree of freedom with respect to conditions of operation. The process of the invention furthermore obviates the need for relatively costly and complex operational procedures heretofore often resorted to, during and after the process of manufacture of the desired hydroxyphenyl alkanes in an endeavor to obtain a product having a high purity.

*Example*

In five separate operations, identified by the designations A, B, C, D, and E, respectively, 2,2-di(4-hydroxyphenyl)propane was prepared by reacting phenol with dimethylketone, in a mole ratio of phenol to dimethylketone of 5.5:1, in the presence of hydrogen chloride, at a temperature in the range of 22° to 52° C., with a contact time of 30 minutes. Ethylmercaptan in the amount of 0.02 mole per mole of dimethylketone was added. The reaction mixture was quenched and freed of unreacted ketone and phenol by distillation. In three additional operations, F, G, H, the operation was repeated under substantially identical conditions with the exception that the reaction was carried out with a mole ratio of phenol to dimethylketone of 11:1.0. The purity of the crude product obtained in terms of melting point and content of 2,2-di(4-hydroxyphenyl)propane in mole percent was determined. Thereupon heptane, preheated to 100° C., was percolated through a bed of the solid product of each operation for a period of from two to six hours. Solvent leaving the bed was distilled. The heptane overhead from the distillation was returned to the percolation. The solid 2,2-di(4-hydroxyphenyl)propane was maintained at 100° C. during the percolation. Upon termination of the percolation the product was dried in air. The purity of the resulting heptane-treated 2,2-di(4-hydroxyphenyl)propane, in terms of melting point and content of 2,2-di(4-hydroxyphenyl)propane, was determined. Results obtained, including purity of the 2,2-di(4-hydroxyphenyl)propane, before and after treatment are set forth in the following table:

| Run | A | B | C | D | E | F | G | H |
|---|---|---|---|---|---|---|---|---|
| Before treatment: | | | | | | | | |
| Melting point, °C | 152.9 | 151.0 | 152.9 | 152.8 | 153.8 | 150.8 | 154.1 | 148.7 |
| Content of 2,2-di(4-hydroxyphenyl)propane, mole percent | 92.6 | 89.0 | 92.6 | 92.4 | 94.3 | 88.6 | 94.9 | 84.6 |
| After treatment: | | | | | | | | |
| Melting point, °C | 155.8 | 154.5 | 155.9 | 156.1 | 156.1 | 155.8 | 156.3 | 156.2 |
| Content of 2,2-di(4-hydroxyphenyl)propane, vol. percent | 98.0 | 95.7 | 98.3 | 98.6 | 98.7 | 98.1 | 99.0 | 98.9 |
| Yield: | | | | | | | | |
| Weight percent of crude 2,2-di(4-hydroxyphenyl)propane | 92.8 | 93.0 | 92.4 | 92.6 | 93.1 | 93.6 | 92.3 | 90.0 |
| Impurities leached out—weight percent of crude charge | 4.5 | 4.2 | 5.5 | 4.6 | 2.9 | 3.7 | 4.5 | 4.5 |
| 2,2-di(4-hydroxyphenyl)propane leached out—wt. percent of crude charge | 2.2 | 2.2 | 1.8 | 2.2 | 2.8 | 2.1 | 2.6 | 2.3 |
| Phenol leached out | 0.5 | 0.6 | 0.3 | 0.6 | 1.2 | 0.6 | 0.6 | 3.2 |

Melting point of pure 2,2-di(4-hydroxyphenyl)propane, °C—156.8.

I claim as my invention:

1. The process for purifying crude 2,2-di(4-hydroxyphenyl)propane containing impurities of resinous character which comprises leaching said 2,2-di(4-hydroxyphenyl)propane while in the solid state with liquid paraffinic hydrocarbon solvent consisting essentially of paraffin hydrocarbons having from 5 to 10 carbon atoms to the molecule at a temperature in the range of from about 50° C. to about 140° C.

2. The process in accordance with claim 1 wherein said solvent consists essentially of heptane.

3. The process in accordance with claim 2 wherein said leaching is carried out at a temperature in the range of from about 80° C. to about 120° C.

4. The process for purifying the crude bis(hydroxyphenyl)propane obtained by the acid-catalyzed condensation of dimethylketone with phenol and containing impurities of resinous character which comprises leaching said crude bis(hydroxyphenyl)propane while in the solid state with a liquid paraffinic hydrocarbon solvent consisting essentially of paraffin hydrocarbons having from 5 to 10 carbon atoms to the molecule at the temperature above about 50° C. but below the melting point of said crude bis(hydroxyphenyl)propane.

5. The process in accordance with claim 4 wherein said paraffinic solvent is heptane.

6. The process for removing residual impurities from crude 2,2-di(4-hydroxyphenyl)propane prepared by the acid-catalyzed condensation of phenol with dimethylketone which comprises suspending said crude 2,2-di(4-hydroxyphenyl)propane while in the solid state in liquid paraffinic hydrocarbon solvent at a temperature of from about 50° C. to about 140° C., and thereafter filtering said solid 2,2-di(4-hydroxyphenyl)propane from the suspension at a temperature in the range of from about 50° C. to about 140° C.

7. The process for removing residual impurities from crude 2,2-di(4-hydroxyphenyl)propane prepared by the acid-catalyzed condensation of phenol with dimethylketone which comprises suspending said crude 2,2-di(4-hydroxyphenyl)propane while in the solid state in liquid heptane at a temperature above about 50° C. but below the melting point of said crude 2,2-di(4-hydroxyphenyl)propane, and thereafter filtering solid 2,2-di(4-hydroxyphenyl)propane from the resulting suspension without reducing to any substantial degree the temperature of said suspension during said filtration.

References Cited in the file of this patent
UNITED STATES PATENTS

| | | |
|---|---|---|
| 1,446,550 | Dissoway | Feb. 27, 1923 |
| 1,978,949 | Kohn et al. | Oct. 30, 1934 |
| 2,669,588 | Deming et al. | Feb. 16, 1954 |
| 2,744,144 | Sheffield | May 1, 1956 |